Patented Aug. 2, 1949

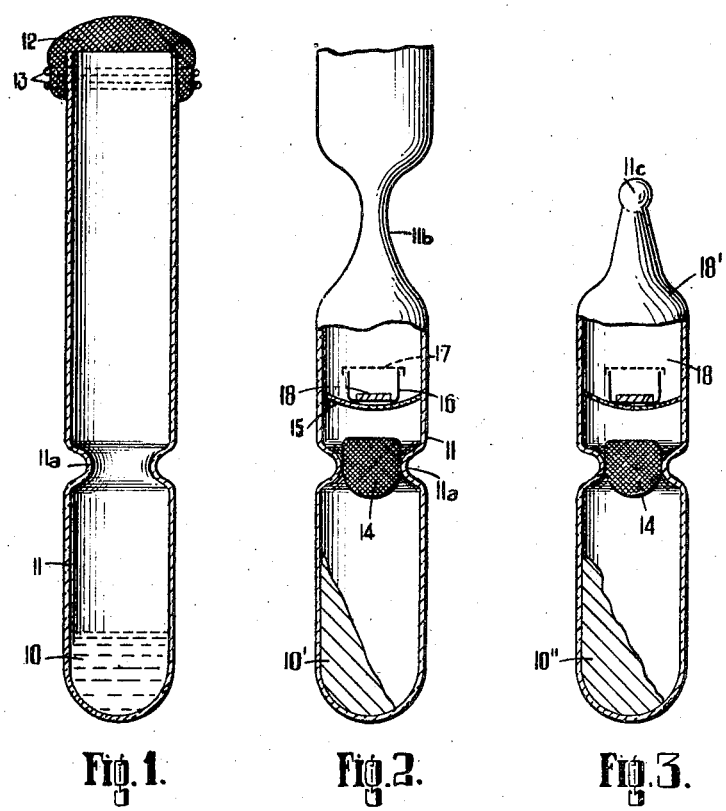

2,477,926

UNITED STATES PATENT OFFICE 2,477,926

STORAGE OF READILY DAMAGED MATERIAL

Ronald Ivan Norreys Greaves, Cambridge, England, assignor to W. Edwards and Company (London) Limited, London, England, a British company Application November 12, 1947, Serial No. 785,435
In Great Britain November 11, 1946

Section 1, Public Law 690, August 8, 1946

6 Claims. (Cl. 128—272)

(Granted under the provisions of sec. 14, act of March 2, 1927; 357 O. G. 5)

This invention concerns the storage of readily damaged material, especially biological or pharmaceutical material, under dry conditions.

According to one aspect of the invention in a method of storing readily damaged material under dry conditions said material is maintained in a closed system containing an inactive gaseous environment, preferably under a high vacuum, and a getter.

According to a further aspect of the invention a method of evacuating a vessel such as an ampoule containing readily damaged material consists in employing a getter in a part of said vessel remote from the material to be stored therein. The vessel may be evacuated, a dry inert gas may then be admitted, thereafter the getter may be generated, the vessel may be further evacuated and finally sealed off.

Freeze drying is frequently the method of choice for the preservation of delicate biological materials. It can be shown, however, that the degree of perfection of storage in most cases is directly related to the residual moisture content of the dried material. For the best possible storage the dried material should be packed in a sealed container, preferably of glass, so that re-wetting cannot take place, and in an inactive gaseous environment preferably under a high vacuum. Under these conditions perfection of storage will depend entirely on the degree of dryness obtained. Measurements of the evolution of water from a freeze-dried product shows that its rate of evolution is exponential. Thus absolute dryness would take an infinite period of time to obtain. In practice small individual amounts can be reasonably dried in one week but longer periods are preferable, and if large numbers of tubes are to be handled in this way the method becomes cumbersome.

Therefore, in accordance with the invention a desiccant in the form of a getter is placed in each tube after the primary freeze-drying, and the tube is then evacuated and sealed, so that secondary desiccation may obtain continuously up to the moment of opening the tube for use.

A getter is selected from the group comprising calcium, barium and calcium-barium alloys, but it is preferred to employ metallic calcium as the desiccant, fired by induced eddy currents over one end of the glass tube. Such a calcium deposit is found to be as avid for water vapour as liquid air condensers and provided the dried material has had its water content so reduced that it is below the level at which the getter would be swamped, it will act as a continuous desiccant. Furthermore, as the calcium metallic deposit takes up water it turns white, thus the presence of the metallic mirror on the tube can be taken as an indication that the material is very dry and that no cracks or pinholes are present in the glass tube.

The invention will be described further, by way of example, with reference to the accompanying drawing, in which:

Fig. 1 is a vertical medial section of a tubular glass vessel in an initial stage of a preferred procedure after introduction of material in liquid phase thereinto and temporary closure thereof;

Fig. 2 is a side elevation, partly in section of the vessel at an intermediate stage of the said procedure; and Fig. 3 is a side elevation, partly in section, of the vessel following completion of the said procedure.

In a preferred procedure, material in liquid condition 10 (Fig. 1) is introduced into the lower portion of a tubular vessel 11 such as a test tube or ampoule having a reduced diameter region 11a or neck intermediate its two ends. The upper, open end of the vessel is temporarily closed by a cotton wool drying cap 12 for maintaining the contents of the vessel sterile, held in position by two rubber bands 13.

After an initial drying process such as freeze-drying (Fig. 2) a porous plug 14 such as of cotton or glass wool is introduced into the neck 11a to effect substantial closure of the lower portion of the vessel containing the dried material 10'. This material frequently assumes the position as shown due to inclination of the vessel during the said initial drying.

A heat resistant support 15 in the form of a mica disc having a serrated edge and/or being perforated is then introduced in the upper portion of the vessel above the sterile plug 14. The diameter of the disc is preferably initially very slightly in excess of that of the diameter of the upper portion of the vessel.

A nickel pan 16 with a gauze cover 17 and containing an iron-clad calcium getter element 18 is placed on the mica support 15 and thereafter a capillary restriction 11b is formed by glass blowing near the upper end of the vessel. The upper end itself is then connected to a vacuum pump system and the vessel is evacuated. The getter is then fired by eddy current high frequency heating and the vessel is again evacuated after which sealing is effected at 11c (Fig. 3) by drawing down the capillary restriction.

It may be desirable to readmit a dry inert atmosphere after evacuation before firing the getter owing to the superior gettering powers of diffused layers produced by vaporizing the getter in the presence of a gas as compared with the brighter getter deposits produced under high vacuum. The getter deposited in this manner in the presence of a gas has no longer the mirror like appearance but is rather equivalent to platinum black in appearance and character, although the colour may not necessarily be absolute black but greyish. This manner of depositing the getter is common practise in the electronic industry and the following extract is taken from an article on the subject:

"After thoroughly de-gassing the getter, the tube is filled with argon or other inert gas to a pressure of 1-3 mm. The getter is flashed, producing the characteristic diffuse layer and the argon is pumped out, leaving the uncontaminated getter layer in a state of high activity. With barium, such a layer is black and the exposed side resembles a layer of lamp black when viewed by the naked eye. Magnesium and aluminium similarly treated give layers in varying shades of grey."

The getter itself is discharged in the form of a calcium mirror 18' on the surface of the vessel above the level of the mica support, and thus remains substantially clear of the neck of the sterile cotton wool plug disposed therein.

When it is required to use the material the vessel is cut around the neck and thus becomes separated into two halves, one of which contains the desiccated material 10" and the other the calcium mirror 18'.

I declare that what I claim is:

1. A product consisting of a sealed evacuated tubular ampoule containing readily damaged material to be stored having a neck between its two ends, said neck dividing said ampoule into two portions one containing the material to be stored, the other, adjacent to a sealed off, originally open end, containing a metallic getter.

2. A product consisting of a sealed evacuated tubular ampoule containing readily damaged material to be stored having a neck between its two ends, said neck dividing said ampoule into two portions one containing the material to be stored, the other, adjacent to a sealed off, originally open end, containing a getter selected from the group consisting of calcium, barium and calcium-barium alloys.

3. A product as set forth in claim 1 having a sterile porous plug in said neck.

4. A product as set forth in claim 1 having a heat resistant disc engaged within that portion of the vessel adjacent the originally open end supporting the means from which said getter is generated.

5. A product as set forth in claim 4 in which said disc is serrated.

6. A product as set forth in claim 4 in which said disc is perforated.

RONALD IVAN NORREYS GREAVES.

REFERENCES CITED

The following references are of record in the file of this patent:

UNITED STATES PATENTS

| Number | Name | Date |
| --- | --- | --- |
| 1,338,429 | Heyl | Aug. 23, 1921 |
| 1,674,928 | Smith | June 28, 1928 |
| 2,018,965 | McQuade | Oct. 29, 1935 |
| 2,314,527 | Taylor | Mar. 23, 1943 |
| 2,357,253 | Coca | Aug. 29, 1944 |